United States Patent

Skutella

[15] 3,667,295
[45] June 6, 1972

[54] OIL GAUGE

[72] Inventor: Stanislaus Skutella, Rothweg 6 A, 7911 Pfaffenhofen-Roth, Germany

[22] Filed: Sept. 2, 1970

[21] Appl. No.: 68,932

[30] Foreign Application Priority Data

Sept. 6, 1969    Germany .......................P 19 45 241.6

[52] U.S. Cl. ..........................................................73/290 R
[51] Int. Cl. ..................................................G01f 23/00
[58] Field of Search................73/290 R, 290 B; 116/118, 109

[56] References Cited

UNITED STATES PATENTS

| | | | |
|---|---|---|---|
| 2,539,604 | 1/1951 | Woolley.................................. | 73/290 R |
| 1,526,377 | 2/1925 | Rosenmund........................... | 73/290 R |
| 1,521,195 | 12/1924 | Johnson................................. | 73/290 R |
| 1,526,376 | 2/1925 | Rosenmund........................... | 73/290 R |
| 2,057,034 | 10/1936 | Kinney................................... | 73/290 R |

FOREIGN PATENTS OR APPLICATIONS

| | | | |
|---|---|---|---|
| 853,853 | 12/1939 | France.................................. | 73/290 R |
| 1,189,271 | 10/1959 | France.................................. | 73/290 R |

*Primary Examiner*—Louis R. Prince
*Assistant Examiner*—Denis E. Corr
*Attorney*—Walter Becker

[57] ABSTRACT

A method of and apparatus for checking the liquid level in a container according to which a tubular member is immersed into said liquid and below its minimum level, whereupon liquid and air is trapped in said tubular member by a piston and a seal about the rod of a piston and the air is compressed by the entrapped liquid, the compression stroke on the entrapped liquid and air furnishing an indication for the liquid level in the respective container.

11 Claims, 5 Drawing Figures

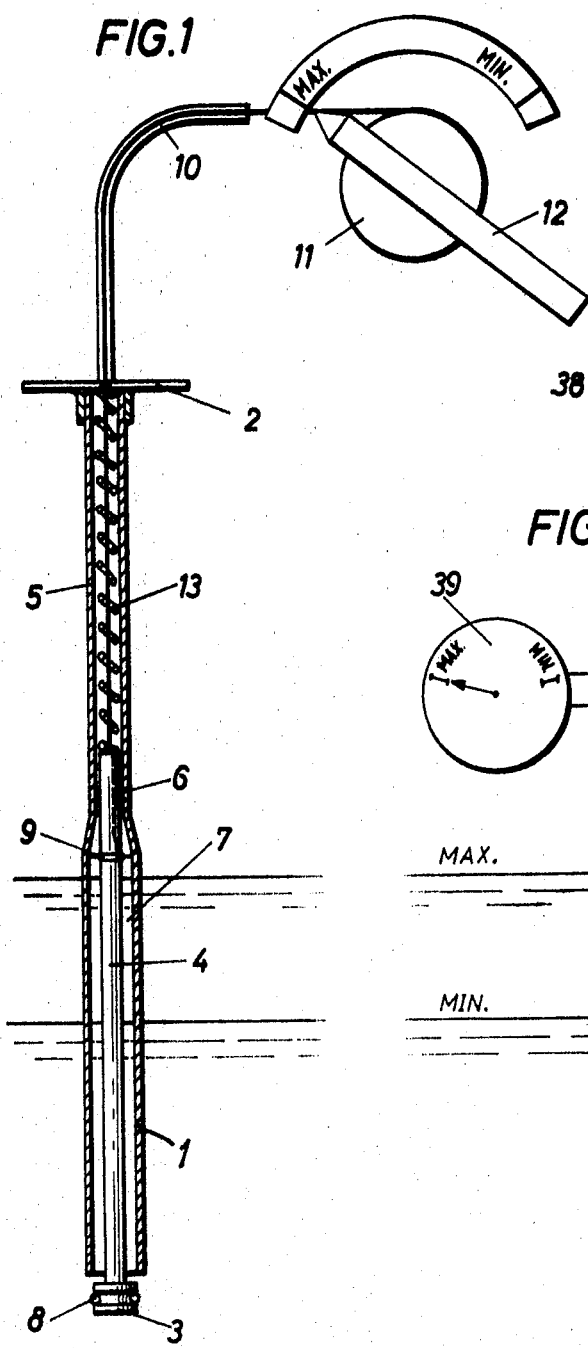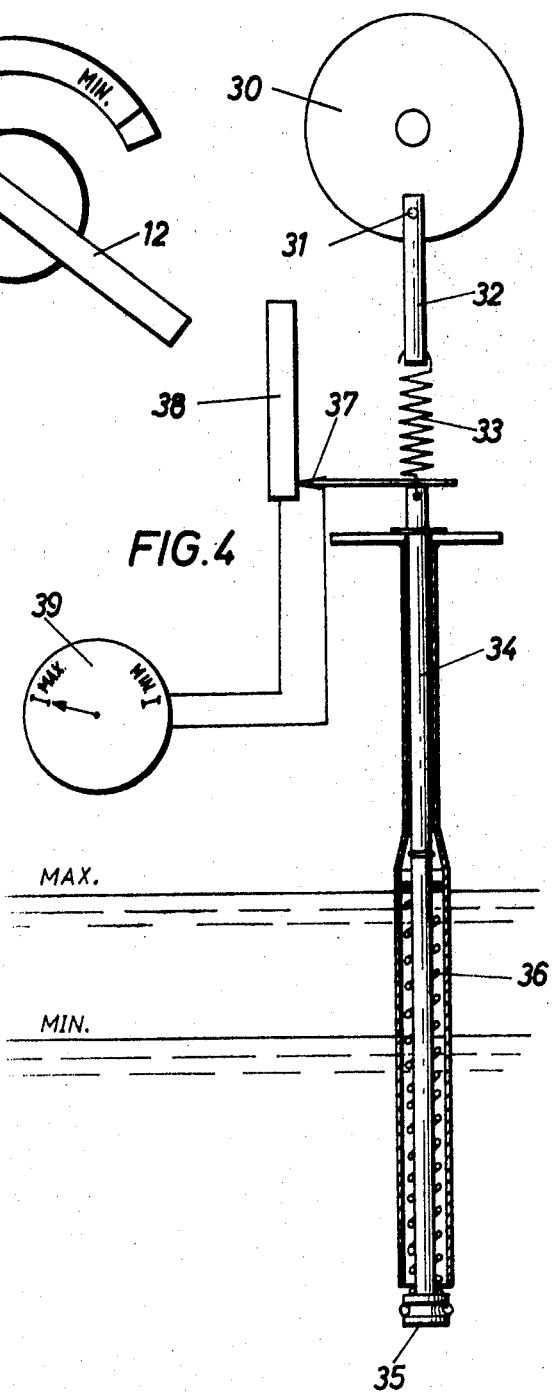

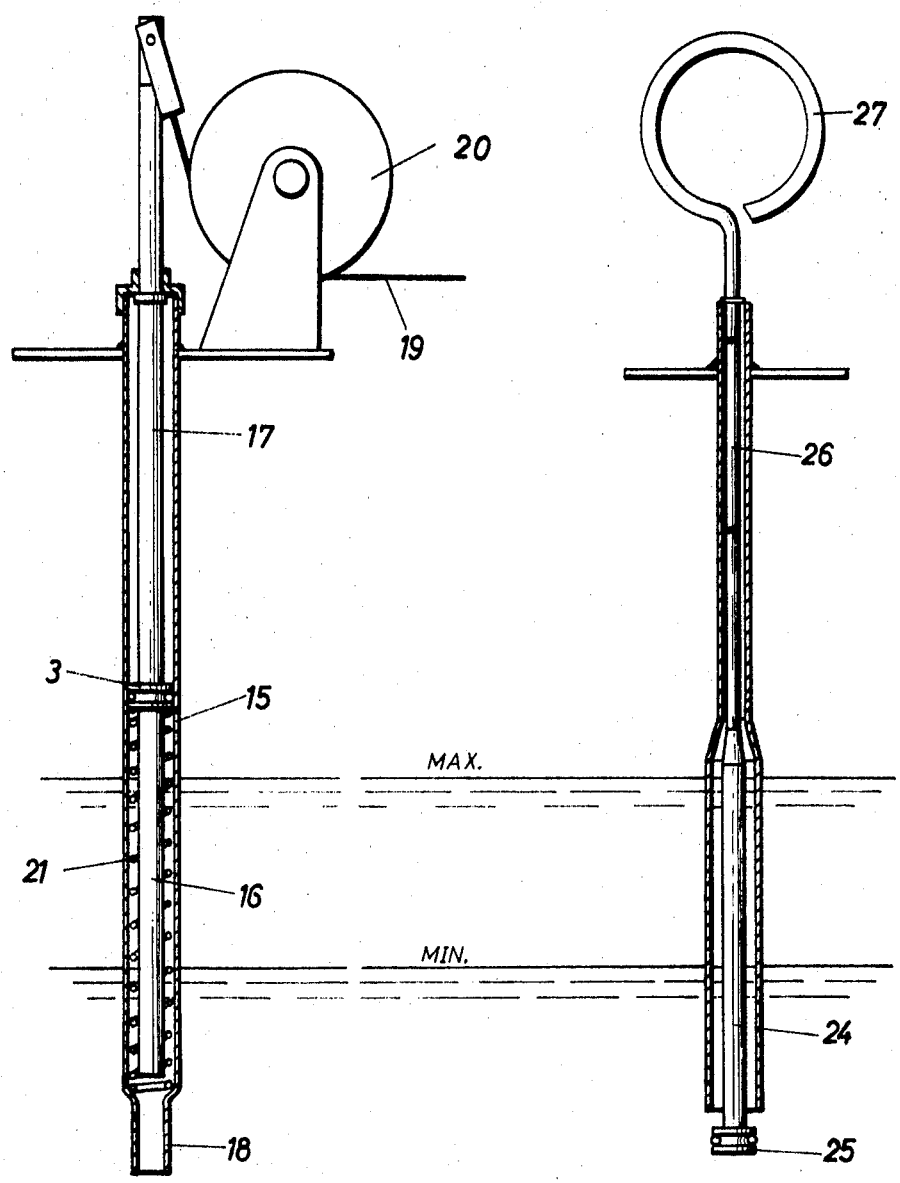

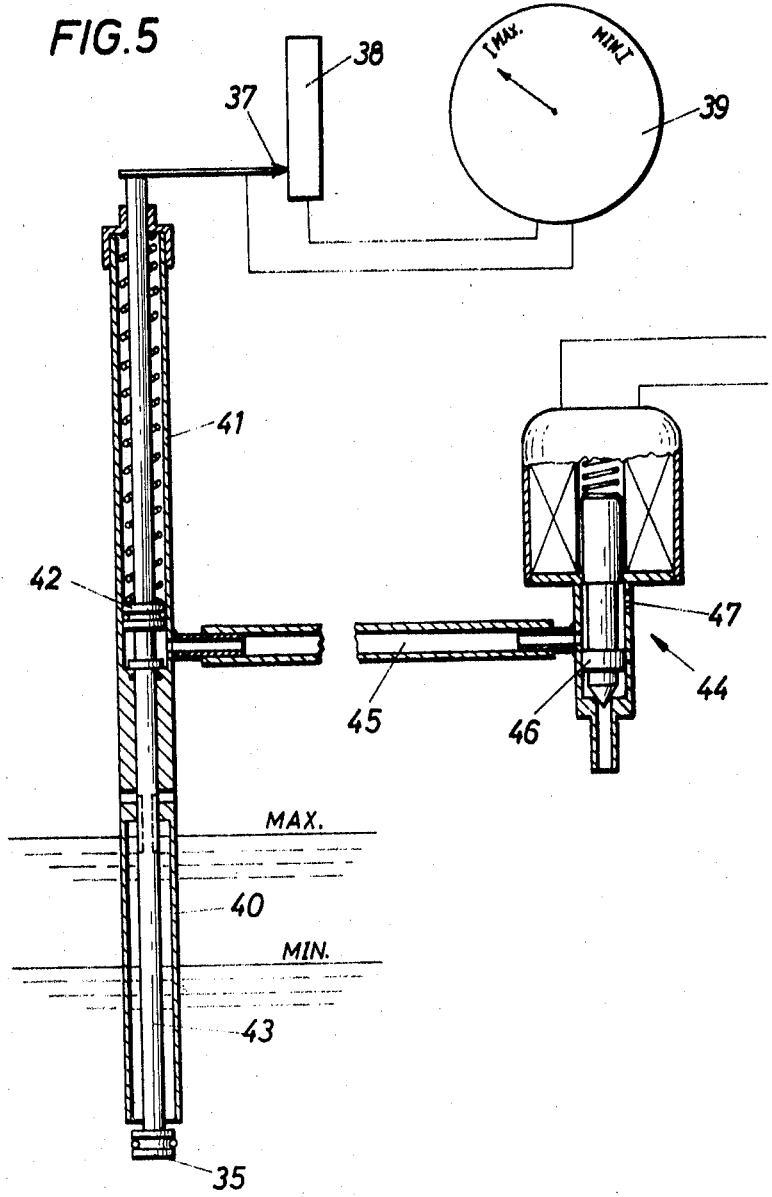

OIL GAUGE

The present invention relates to a method of and device for checking the liquid level in a container, especially the oil level in the crankcase of a piston engine, by means of a cylinder communicating with the container while in the cylinder a piston is displaceable in conformity with the respective liquid level, and the stroke of the piston can be read.

Devices of this type which preferably serve for checking the oil level in vehicle-internal combustion engines, have become known. According to such devices, the piston is displaced from an upper starting position in downward direction up to the oil level after the cylinder at the start of the piston movement has been closed at the bottom by a valve or an extension of the piston which extension forms a control valve. During the measuring stroke, the air entrapped above the oil level escapes through an opening in the piston which, when the piston engages the oil level, is closed by a valve.

According to other heretofore known devices, the opening in the piston forms a throttling area of such small cross-section that, after the air during the downward stroke of the piston has escaped, the considerably higher flow resistance of the succeeding lubricating oil gives an indication of the respective height of the oil level. The closing of the cylinder and of the piston opening by valves and also the design in the form of a throttling area have inherent a certain lack of precision in the gauging in view of the fact that the area of the valve closure and the increase in pressure will in case of the throttling area depend on the speed of the piston movement. A soiling or hardening of the oil, especially at those areas which are above the oil level, can easily impair the functioning of the device.

Inasmuch as the reliability of the gauging is of extreme importance for the engine, it is an object of the present invention to provide an oil gauge which will overcome the above mentioned drawbacks.

This object and other objects and advantages of the invention will appear more clearly from the following specification in connection with the accompanying drawings, in which:

FIG. 1 illustrates a gauge which comprises a piston operable by a Bowden wire and adapted to be displaced in upward direction for carrying out a measuring stroke.

FIG. 2 shows a device similar to that of FIG. 1 but with the measuring stroke of the piston effected in downward direction by means of a cable or the like.

FIG. 3 illustrates a gauge according to the invention which is operable manually by direct engagement of the piston rod.

FIG. 4 shows a device according to the invention with remote control by an electric motor.

FIG. 5 illustrates a gauge according to the invention in which the measuring operation is effected by means of a pressure fluid cylinder mounted above the measuring cylinder.

The method according to the invention for checking the liquid level of a fluid is characterized primarily in that the cylinder is at the start of the piston movement closed at the bottom and at the top so that the air above the liquid level remains entrapped during the subsequent piston stroke in the cylinder. The closing of the cylinder at the bottom and at the top at the start of the piston movement can easily be controlled so that the reliability of the measuring step is not affected or endangered. On the other hand, tests have proved that the elasticity of the air entrapped in the cylinder during the measuring stroke does not endanger the usefulness of the measuring operation. In this connection it should be noted that on one hand the checking of the liquid level is not intended to represent an absolute measurement, but, especially when the oil level in the crankcase of an internal combustion engine is involved, it is merely intended to ascertain whether and approximately where the liquid level is located within the prescribed limits. On the other hand, even when carrying out the measuring stroke manually, only negligible differences in the measured results will occur. The compression pressure will during the stroke increase progressively to such an extend that a stroke limitation can easily be felt. Deviations in the measurement may furthermore be reduced by carrying out the measuring stroke by means of a small handle to which can be applied manual forces only not forces exerted by the arm.

With respect to a device for carrying out the method according to the invention, it is suggested that the piston is displaceable from a starting position below the lowermost liquid level in upward direction while it will first close the lower cylinder opening. This direction of the piston stroke primarily has the advantage that the measuring stroke is carried out by direct engagement of a pulling member, for instance a Bowden wire, with the piston rod which pulling member may, for instance, extend from the crank housing of the motor to the dashboard of the vehicle where the actuation of said member is effected.

A further advantage of the stated stroke direction consists in that the piston when occupying its starting position, is located below the liquid level so that the seals will not stick. The above mentioned advantages also apply when the air above the liquid level does not remain entrapped in the cylinder during the measuring stroke.

Furthermore, in the device according to the present invention the piston rod which extends from the cylinder at the upper end thereof is advantageously designed in the form of a slide which closes a guiding bore at the start of the piston stroke. Such positive control which is directly related to the movement of the piston will, similar to the movement of the piston, result in a maximum degree of reliability.

A device according to the invention for checking the liquid level may inversely also be so designed that the piston is from its starting position displaceable in downward direction while a piston rod acting as control slide or valve spool will at the start of the piston stroke close a previously open guiding bore at the lower end of the cylinder. If the measuring stroke is effected by means of a pulling member, a lever or roller reversing the direction of movement of the lever may be interposed.

The piston is advantageously sealed by means of a simple O-ring or by another equivalent soft seal in the cylinder. For the purpose involved in the present case, it may under certain circumstances suffice to provide a close fit between the piston and the cylinder without an additional seal. Similar remarks apply to the piston rod acting as slide or valve spool. The piston rod may be provided with a seal in the form of an O-ring or may be sealed solely by a suitable fit of the piston rod and the guiding bore.

The device according to the invention for checking the liquid level may, in a manner known per se, be actuated by directly manually engaging the piston rod or may be remote controlled. The oil level in a motor located in front of a vehicle is advantageously checked by hand by means of a pulling member provided at the dashboard. When longer distances are involved, for instance between the motor located in the rear of a bus and the dashboard, also an actuation by means of an electric motor or a pressure fluid motor may be effected. The measured result may also be indicated at the dashboard by means of an electric device.

Referring now to the drawings in detail and FIG. 1 thereof in particular, the cylinder 1 shown therein is connected by a flange 2 in the opening of the crankcase of the internal combustion engine in such a way that the lower end of the cylinder is immersed below the lowermost oil level. In the illustrated lower starting position, the piston 3 is located closely below the lower edge of the cylinder so that a free connection with the crank chamber or crank pit is established. The piston rod 4 is guided in a reduced upper portion 5 of the cylinder. A long groove 6 in the upper portion of the piston rod establishes communication between the air chamber 7 of the cylinder 1 above the oil level with the air chamber of the crank housing. Cylinder and crank housing thus communicate freely with each other which means the oil level will have the same height in the crank housing and said cylinder.

The piston 3 and the piston rod 4 each comprise an O-ring 8, 9 for sealing the cylinder 1 or for establishing a seal in the upper portion 5 serving as guiding means. Inasmuch as wear is hardly to be expected, it will be appreciated that, depending on the material and tolerance of the fitting, a separate seal may not be needed.

A Bowden wire 10 fastened to piston rod 4 extends to the dashboard of the motor vehicle where the steel wire is connected to the circumference of a pulley 11. A handle 12 connected to the pulley 11 or its shaft and simultaneously serving as pointer also serves for actuating the measuring stroke. A helical spring 13 returns the piston to its starting position. Shortly after the measuring stroke has started, the cylinder is closed at the bottom and at the top, and the entrapped oil is lifted by the piston until the air entrapped thereabove has been compressed to such an extent that at the end position of the piston, the air acts like a fixed abutment. Preferably, the interior of the reduced portion 5 is in communication with a pressure gauge G which indicates the compression of the compressed air above the piston rod 4. While the stroke of piston rod 4 may be read in any convenient manner, e.g. through a sight glass in part 5, gauge G may instead be provided with an additional seal indicating the respective stroke of piston rod 4 corresponding to the respective desired pressure to which the air above piston rod 4 is to be compressed for each liquid level measurement.

With the device illustrated in FIG. 2, the measuring stroke of the piston 3 is carried out in a downward direction. In the illustrated upper starting position, the piston frees the connecting openings 15 to the space above the oil level. A lower extension 16 of the piston rod 17 acts as slide or valve spool which, after a short starting stroke, immerses in guiding means 18 at the lower cylinder end whereby the cylinder is closed. The measuring stroke of the piston is effected by a cable 19 which engages the upper end of the piston rod and is deviated by a roller 20. A spring 21 for returning the piston to its starting position will in this design be located within the measuring cylinder.

The device according to FIG. 3 fundamentally corresponds to the device of FIG. 1 and excels by a great simplicity. More specifically, the piston rod 24 of piston 25 is at its upper extension 26 provided with an eye 27 for a direct manual actuation. The extension 26 has a somewhat shorter diameter than the piston rod 24 so that in the starting position of the measuring stroke an air connection is established through an annular gap. The closure is effected by the piston simultaneously with the closure of the lower end of the cylinder. Inasmuch as the eye 27 permits an actuation in both directions, a spring for the return stroke becomes superfluous. For purposes of indicating the measuring result, a scale is provided on the extension 26 of the piston rod.

The remote controlled device according to the invention of FIG. 4 employs an electric motor 30 with stepdown transmission and a crank pin 31 which through the intervention of a pushrod 32 and a stroke compensating spring 33 engages the upper end of the piston rod 34 and carries out the measuring stroke of the piston 35 over half a revolution. Following the engagement of the motor, the latter will run up to the oppositely located dead center position of the crank pin 31 at which non-illustrated limit switches interrupt the current. When the motor is again turned on, the crank pin 31 returns to the illustrated starting position while the piston is by a spring 36 likewise returned to its starting position. A contact 37 of a sliding resistor 38 which contact is insulated and arranged at the upper end of the piston rod 34, indicates the respective piston stroke on an electric measuring device 39 which can be viewed by the driver.

Finally, FIG. 5 illustrates a device which is likewise remote controlled. Coaxial above the measuring cylinder 40 there is provided a pressure fluid cylinder 41 the piston 42 of which is provided on the extended measuring piston rod 43. A magnetic valve 44 operable from the driver's seat establishes communication between a non-illustrated pressure fluid container and the cylinder through a conduit 45 for bringing about the measuring stroke. A slide or valve spool 46 provided on the valve shank blocks the connection with a relief opening 47 thereabove through which, following the completion of the measuring operation and after again closing the valve, the compressed air escapes from the cylinder 41 into the atmosphere. An electric indication visible by the driver is brought about by the same means as described in connection with the device of FIG. 4.

Devices of the type set forth above in connection with FIGS. 4 and 5 are intended primarily for longer distances, as for instance between the driver's seat and the driving engine in the rear end of a bus.

It is, of course, to be understood that the present invention is, by no means, limited to the particular showing in the drawings but also comprises any modifications within the scope of the appended claims.

What I claim is:

1. A method of checking the liquid level in a container, especially the oil level in a crank case of a reciprocable piston engine, which includes the steps of: immersing a tubular member into the liquid the level of which is to be measured and below the minimum level of said liquid so that the liquid level in said tubular member will be the same as in the container, entrapping the thus obtained liquid column in said tubular member and the air above said liquid column while compressing said air by said liquid column until a predetermined resistance is encountered, and measuring the stroke of said liquid column necessary to obtain said predetermined resistance.

2. An apparatus for checking the liquid level in a container, especially the oil level in a crank case of a reciprocable piston engine, which includes cylinder means open at one end, said end being immersable into and below the minimum liquid level in a container, control means selectively reciprocable in said cylinder means from a first position in which air and liquid can pass into and out of said cylinder means to a selected second position in which the liquid and air in said cylinder means are entrapped and said last mentioned air will be compressed by said control means, and means for measuring the respective compression stroke of said control means.

3. An apparatus according to claim 2, in which said cylinder means comprises a lower larger diameter section to be immersed in the liquid the level of which is to be measured and also comprises an upper smaller diameter section, and in which said control means includes a piston movable from a position outside and below said larger diameter section into said larger diameter section so as to sealingly engage the same, said control means also including a piston rod connected to said piston and movable into said upper smaller diameter section so as to sealingly engage the same.

4. An apparatus according to claim 3, in which said piston is provided with a sealing O-ring engaging said cylinder means.

5. An apparatus according to claim 3, in which said piston rod is provided with a sealing O-ring engaging said cylinder means.

6. An apparatus according to claim 2, in which said cylinder means comprises a lower narrower diameter section to be immersed into the liquid the level of which is to be measured and also comprises an upper larger diameter section, and in which said control means includes a piston sealingly reciprocable in said upper section and also includes a piston rod connected to said piston and movable selectively from said upper section into said lower section to sealingly engage the same and entrap liquid and air in said upper section and compress the air therein.

7. An apparatus according to claim 6, in which said piston is provided with a sealing O-ring engaging said cylinder means.

8. An apparatus according to claim 4, in which said piston rod is provided with a sealing O-ring engaging said cylinder means.

9. An apparatus according to claim 2, which includes spring means associated with said control means and continuously urging said control means to said first position.

10. An apparatus according to claim 2, which includes electric motor means with stepdown transmission means and crank pin means operatively connected to said control means, and limit switch means operatively connected to said electric motor means and said crank pin means and operable in response to one-half revolution of said crank pin and the completion of a corresponding measuring stroke of said control means to break the circuit for said electric motor means.

11. An apparatus according to claim 2, which includes fluid pressure operable piston means operatively connected to said control means for actuating the latter to bring about a liquid level measuring operation, and remote controllable valve means operatively connected to said fluid operable piston means for controlling the supply of actuating fluid to and from said last mentioned piston means.

* * * * *